(12) United States Patent
Stuart

(10) Patent No.: US 6,386,525 B1
(45) Date of Patent: May 14, 2002

(54) DUAL VOLUME AIR SPRING FOR SUSPENSIONS

(75) Inventor: John W. Stuart, Romeoville, IL (US)

(73) Assignee: The Boler Company., Itasca, IL (US)

( * ) Notice: Subject to any disclaimer, the term of this patent is extended or adjusted under 35 U.S.C. 154(b) by 0 days.

(21) Appl. No.: 09/696,475

(22) Filed: Oct. 24, 2000

(51) Int. Cl.$^7$ .................................................. F16F 9/04
(52) U.S. Cl. .............................. 267/64.27; 267/64.22; 267/64.23; 267/64.24; 267/64.25
(58) Field of Search ......................... 267/64.11, 64.18, 267/64.19, 64.21, 64.22, 64.23, 64.24, 64.25, 64.26, 64.27, 64.28

(56) References Cited

U.S. PATENT DOCUMENTS

| | | | |
|---|---|---|---|
| 3,319,952 A | * | 5/1967 | Travers ........................ 267/65 |
| 3,475,015 A | * | 10/1969 | Hirst ............................ 267/65 |
| 4,410,006 A | * | 10/1983 | Moulton ................... 137/493.8 |
| 4,506,910 A | * | 3/1985 | Bierens ....................... 280/711 |
| 4,666,135 A | | 5/1987 | Buma et al. |
| 4,697,796 A | | 10/1987 | Kitamura et al. |
| 4,722,548 A | | 2/1988 | Hamilton et al. |
| 4,735,401 A | | 4/1988 | Buma et al. |
| 4,993,694 A | | 2/1991 | Gandiglio et al. |
| 5,201,500 A | * | 4/1993 | Ecktman ..................... 267/140 |
| 5,382,006 A | * | 1/1995 | Arnold ..................... 267/64.27 |
| 5,535,994 A | * | 7/1996 | Safreed, Jr. ............... 267/64.27 |
| 5,934,652 A | * | 8/1999 | Hofacre et al. .......... 267/64.27 |
| 5,941,510 A | * | 8/1999 | Grass et al. .............. 267/64.27 |
| 6,109,598 A | * | 8/2000 | Hilburger et al. ........ 267/64.24 |
| 6,113,081 A | * | 9/2000 | Hilburger et al. ........ 267/64.27 |
| 6,234,460 B1 | * | 5/2001 | Arnold ........................ 267/35 |
| 6,250,613 B1 | * | 6/2001 | Koeske et al. ................ 267/66 |

* cited by examiner

Primary Examiner—Christopher P. Schwartz
Assistant Examiner—Benjamin A Pezzlo
(74) Attorney, Agent, or Firm—Cook, Alex, McFarron, Manzo, Cummings & Mehler, Ltd.

(57) ABSTRACT

A dual volume air spring for a truck suspension, which has an air bag chamber providing a variable volume and a fixed volume chamber. The chambers are interconnected by a closable orifice. The air bag is provided with a post-like orifice closer which is pushed into the orifice when the air bag is sufficiently compressed ad withdrawn from the orifice when the air bag is not compressed. In normal operation the orifice is open and the combined volumes of the chambers are available resulting in a low spring rate. The orifice closer has an orifice closing portion which is relatively pliant and a rigid or semi-rigid portion which acts as a bump-stop when the pliant portion is substantially completely compressed. When the orifice is completely closed the spring has a high spring rate.

4 Claims, 2 Drawing Sheets

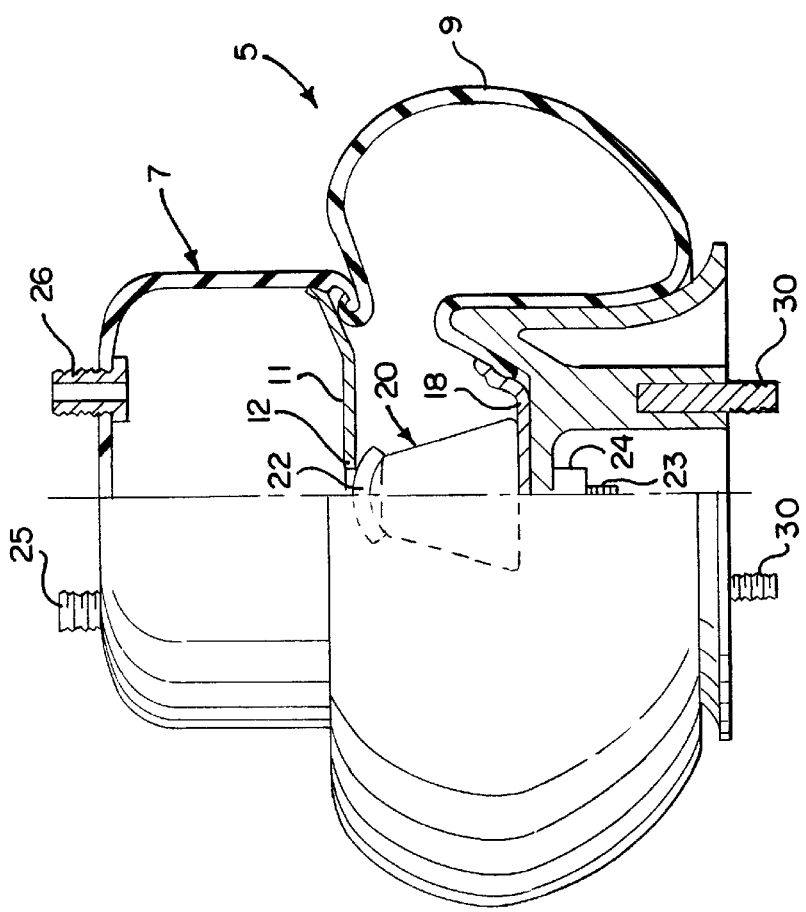
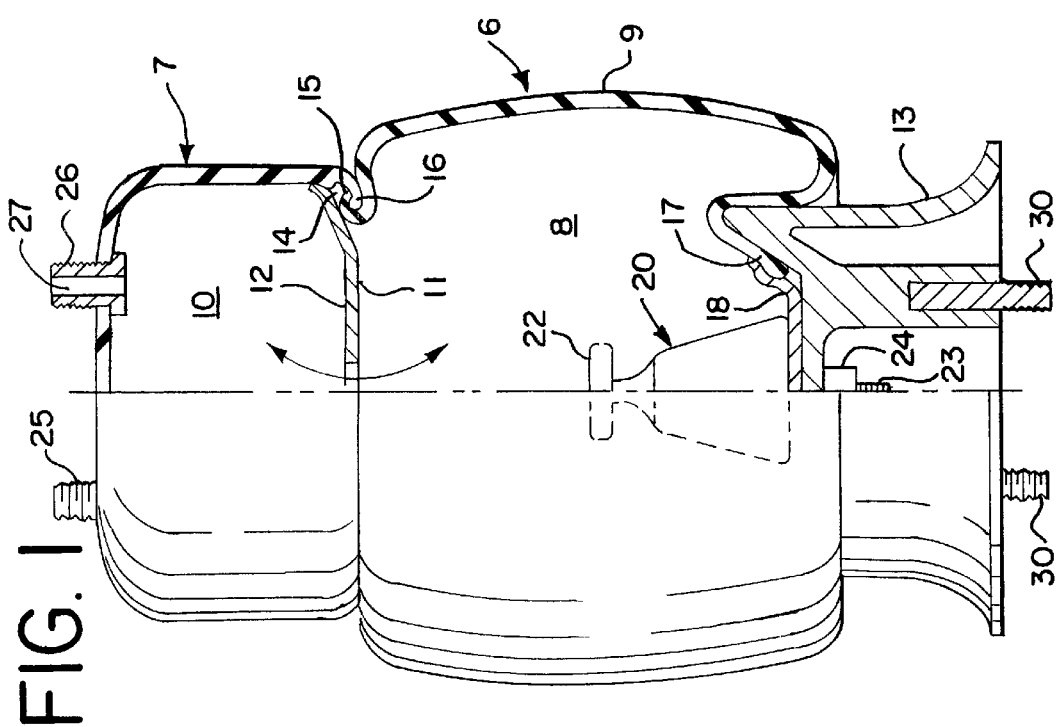

DUAL VOLUME AIR SPRING FOR SUSPENSIONS

BACKGROUND OF THE INVENTION

Air springs are widely used on vehicle suspension systems since they generally result in a lower system spring rate and a lower vehicle natural frequency than other available types of springs. A low spring rate and low natural frequency result in superior isolation of road-induced disturbances and improved contact between the wheels and road surface (in other words a better ride). Unfortunately, decreasing the spring rate also decreases roll stability and increases suspension travel, both of which can be a negative feature in some applications.

A number of methods have been employed to overcome this trade-off. Many suspensions employ a bump-stop to limit axle travel and body roll. However, when the bump-stop is contacted very high loads are transmitted directly into the vehicle frame resulting in undesirable harshness. Other designs have made use of costly valves or control units to vary the spring rate and natural frequency.

BRIEF SUMMARY OF THE INVENTION

The present invention provides an innovation in air springs when used in suspensions, particularly for heavy duty trucks and trailers. The air springs of the invention have dual volumes, one being a compressible variable chamber and the other being a fixed volume chamber. The interiors of the two chambers are separated by a partition which has an orifice therein providing air or gas flow communication between the chambers. A post-like orifice closer or plug is mounted within the compressible variable volume chamber for closing the orifice during jounce action of the associated suspension. The post-like closer has a deformable or resilient portion which has a low spring rate and a relatively rigid portion which has a high spring rate. During a jounce of the associated suspension of sufficient severity the deformable portion of the post-like orifice closer engages and closes the orifice thereby isolating the fixed volume chamber from the variable volume chamber. In the event of a sufficiently severe jounce the rigid portion of the post-like closer comes into play and arrests further jounce movement.

BRIEF DESCRIPTION OF THE DRAWINGS

For a complete understanding of the nature and scope of the invention and a description of a preferred embodiment reference may now be had to the accompanying drawings wherein:

FIG. 1 is a semi-vertical sectional and side elevational view of a dual chamber air spring forming a presently preferred embodiment of the invention;

FIG. 2 is a vertical sectional view of the air spring of FIG. 1 in a compressed condition with its post-like orifice closer in contact with and closing the orifice in the partition between the chambers;

DETAILED DESCRIPTION OF THE INVENTION

Figure 3:
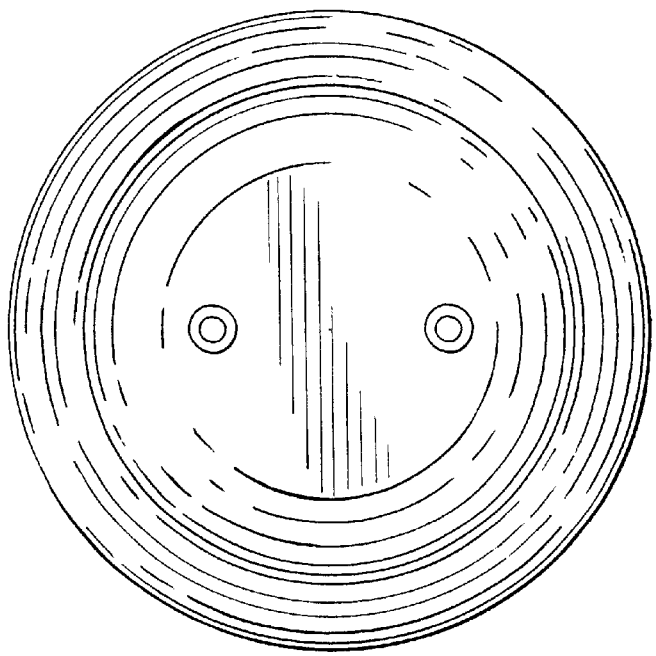
FIG. 3 is a top plan view of the air spring of FIG. 1.
Figure 4:
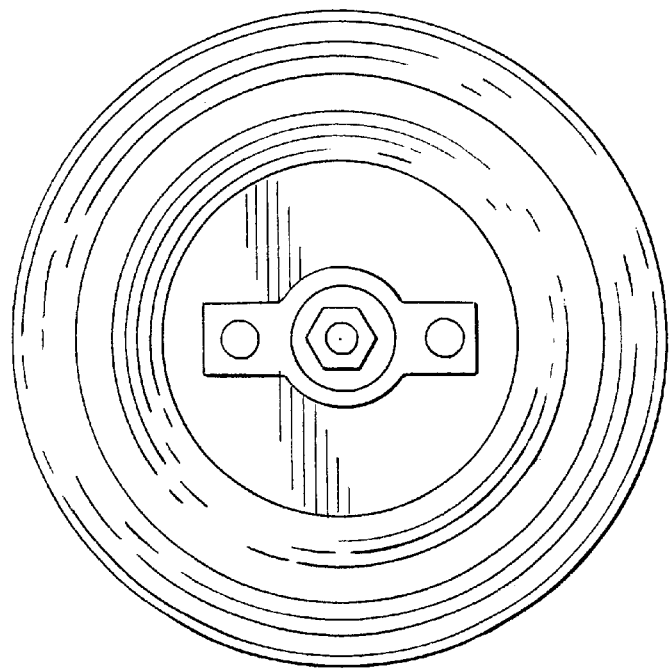
FIG. 4 is a bottom plan view of the air spring of FIG. 1.
Figure 5:
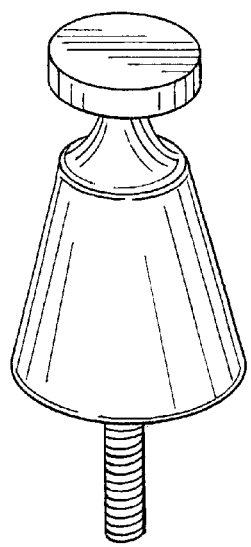
FIG. 5 is a perspective view of the post-like orifice closer incorporated in the air spring of FIG. 1.

Referring to the drawings, in FIGS. 1–4 a dual volume air spring is indicated generally at 5 embodying the invention and comprising a compressible variable volume chamber indicated generally at 6 and a fixed volume rigid chamber indicated generally at 7. The interiors 8 and 10, respectively, of the chambers 6 and 7 are separated by a rigid partition plate 11 provided in the center with an orifice or opening 12.

The variable volume chamber 6 has a construction corresponding generally to that of known commercially available air springs for truck and trailer suspensions. It has a generally cylindrical compressible body formed rubber, or rubber-like sheet material 9 the upper end of which is closed by the rigid plate 11 while the lower end is closed by a base 13 usually referred to as the air spring "piston".

The rigid upper chamber 7 is also generally cylindrical in shape and formed from sheet metal or other suitable rigid or non-expandable material. The rigid plate 11 closes the bottom end of the chamber 7 with the periphery of the plate being welded to the interior of the chamber 7 as indicated at 14. The circumferential lip 15 of the air bag 9 is hermetically sealed or crimped between the underside of the rigid plate 11 and the inwardly curled lip 16 of the rigid chamber 7.

The lower lip 17 of the air bag 9 is hermetically sealed and secured between the periphery of a washer-like plate 18 and a corresponding dish-like surface of the base 13. Thus, the variable volume compressible chamber 6 is hermetically sealed in accordance with the known construction of commercially available air springs.

A post-like orifice closer for the orifice 12 is indicated generally at 20 formed by a frusto-conical base 21 forming a bump stop and formed of a rigid, or semi-rigid material and a compressible plug 22 formed of a pliant material. From FIG. 2 it will be seen that when the chamber 6 is in its compressed condition during jounce of the associated suspension the plug or stopper 22 engages the underside of the rigid separator or partition 11 so as to close the orifice 12. The plug 20 has a relatively low spring rate until it is firmly compressed onto the bump stop 21 which has a high spring rate. The plug or stopper portion 22 may be formed of a relatively low durometer rubber or polyurethane material of known commercial type. While the bump-stop 21 may be formed of high durometer natural rubber, high durometer polyurethane, Hydril a (DuPont thermoplastic elastomer) or similar materials of known commercial type. The base of the bump stop 21 is provided with a stud 23 which projects through apertures in the washer 18 and the base 13. A nut 24 secures post-like orifice closer in place.

The top of the rigid chamber 7 is provided with a pair of studs 25 and 26 whereby the air spring 5 may be mounted in known manner on a suspension and attached at its upper end to a rigid part of a vehicle chassis. The stud 26 has a passageway 27 through which air or other gas may be introduced into the air spring 5 as required. Lower mounting studs 30-30 are implanted or press fitted into the bottom of the base 13.

In operation, one or more air springs 5 will be mounted in known manner on each opposite side of a vehicle suspension so as to support a vehicle chassis on an axle and associated ground wheels. Depending on the load on the vehicle, the variable chamber 6 will be partially compressed with the portion of the load on each air spring 5 being supported by the air or gas under compression in the volume formed by the combined volumes of the chambers 8 and 10 which are in communication through the orifice 12. Because of these combined volumes the air spring 5 initially will have a relatively low spring rate in accordance with the following equation:

$$K=[nA^2(P+P_{AT})]/V$$

Where:

n=The gas constant (~1.4 for air)

A=Effective area

P=Air spring pressure $P^{AT}$=Atmospheric pressure

V=Air spring volume

As can be seen from the equation the volume is inversely proportional to spring rate. To minimize the spring rate many deigns increase the air volume to be as large as practical.

In operation, an air spring 5 installed in a conventional manner in a vehicle suspension, such as a heavy duty truck-tractor, will re-act to road irregularities in a conventional air spring operating manner except that the ride will be softer or easier than normal due to the combined volumes of the chambers 8 and 10 acting in concert. However, when the vehicle encounters a severe irregularity the compressible air bag 9 will be compressed during jounce to the point that the plug 22 closes the orifice 12 as shown and illustrated in FIG.2. Thereupon, only the volume of the chamber 8 will be operational and in accordance with the foregoing equation the volume V will be lower than normal and consequently the spring rate will be proportionately higher than normal.

In the event that further jounce travel occurs the air spring 5 becomes progressively stiffer as plug 22 becomes fully compressed and the bump stop 20 begins to provide resistance to jounce travel.

The action of the post-like orifice closer 20 can be varied in several ways such as by altering its shape and selecting different materials for forming the plug 22 and the base 21. Further, more than two different materials may be used so as to provide a plurality of spring rates ranging between the highest spring rate and the lowest spring rate.

What is claimed is:

1. In combination with a vehicle suspension subject to bounce and jounce while the vehicle is in motion and including at least one dual chamber air spring comprising a compressible variable volume chamber and a fixed volume chamber, a partition separating said two chambers and said partition having at least one orifice therein providing gas flow communication between the two chambers, a post-like orifice closer mounted within said compressible variable volume chamber for co-action with each said orifice when the variable volume is sufficiently reduced during jounce of the suspension, each said post-like orifice closer having a pliant portion engageable with a said orifice and a rigid portion whereupon during jounce said pliant portion initially closes said orifice with which it is associated and isolates said fixed volume chamber from said compressible variable volume chamber and subsequently on further compression of the variable volume chamber said rigid portion resists further jounce.

2. The combination of claim 1 wherein the dual chamber air spring is generally cylindrical in shape and said orifice in said partition and said post-like orifice closer are co-axially aligned in said spring.

3. The combination of claim 1 wherein said post-like orifice closer provides a relatively low spring rate when said orifice is initially closed during jounce and subsequently on continued jounce provides a substantially higher spring rate.

4. The combination of claim 1 wherein said post-like orifice closer has an orifice closing portion which is pliant and a rigid or semi-rigid portion which acts as a bump stop when said pliant portion is substantially completely compressed.

* * * * *